(12) United States Patent
Gokhale et al.

(10) Patent No.: US 8,555,275 B1
(45) Date of Patent: Oct. 8, 2013

(54) METHOD AND SYSTEM FOR ENABLING AN APPLICATION IN A VIRTUALIZED ENVIRONMENT TO COMMUNICATE WITH MULTIPLE TYPES OF VIRTUAL SERVERS

(75) Inventors: Geeta Parag Gokhale, Pune (IN); Timothy J. Clayton-Luce, Raleigh, NC (US); Umesh Betahalli Venkatesh, Bangalore (IN)

(73) Assignee: NetApp, Inc., Suunyvale, CA (US)

( * ) Notice: Subject to any disclaimer, the term of this patent is extended or adjusted under 35 U.S.C. 154(b) by 1591 days.

(21) Appl. No.: 11/796,336

(22) Filed: Apr. 26, 2007

(51) Int. Cl.
 *G06F 9/455* (2006.01)
 *G06F 9/46* (2006.01)
 *G06F 13/00* (2006.01)

(52) U.S. Cl.
 USPC .............................. 718/1; 718/104; 719/324

(58) Field of Classification Search
 USPC ............... 718/1, 104, 100, 101, 102; 719/324
 See application file for complete search history.

(56) References Cited

U.S. PATENT DOCUMENTS

| | | | | |
|---|---|---|---|---|
| 5,838,972 A * | 11/1998 | Matsuzuka et al. | ........... | 719/332 |
| 5,961,582 A * | 10/1999 | Gaines | ................ | 718/1 |
| 6,977,927 B1 * | 12/2005 | Bates et al. | ..................... | 370/381 |
| 7,370,335 B1 * | 5/2008 | White et al. | ................... | 719/328 |
| 2002/0143842 A1 * | 10/2002 | Cota-Robles et al. | ............. | 709/1 |
| 2003/0070001 A1 * | 4/2003 | Belknap et al. | ................ | 709/321 |
| 2006/0064523 A1 * | 3/2006 | Moriki et al. | ..................... | 710/62 |
| 2006/0143617 A1 * | 6/2006 | Knauerhase et al. | .......... | 718/104 |
| 2006/0206904 A1 * | 9/2006 | Watkins et al. | ................ | 719/321 |
| 2007/0094367 A1 * | 4/2007 | Esfahany et al. | .............. | 709/223 |
| 2008/0148296 A1 * | 6/2008 | Chen et al. | ..................... | 719/328 |

* cited by examiner

*Primary Examiner* — Camquy Truong
*Assistant Examiner* — Willy W Huaracha
(74) *Attorney, Agent, or Firm* — Blakely, Sokoloff, Taylor & Zafman LLP

(57) ABSTRACT

A method and system are introduced to enable an application in a virtualized environment to communicate with multiple types of virtual servers (e.g., VMware ESX server, Microsoft Virtual Server, etc.), yet without making any source code change to the application. An interface is provided so that an application (e.g., a storage management application) running in a virtual machine is able to communicate with the underlying virtual server to receive information regarding some physical hardware that are not virtualized by the virtual server. For example, such physical hardware may be an iSCSI Host Bus Adapter (iSCSI HBA) or a Fiber Channel Protocol Host Bus Adapter (Fcp HBA). After receiving such information, the application can access the physical hardware to provide services to other applications, such as storage management services.

14 Claims, 7 Drawing Sheets

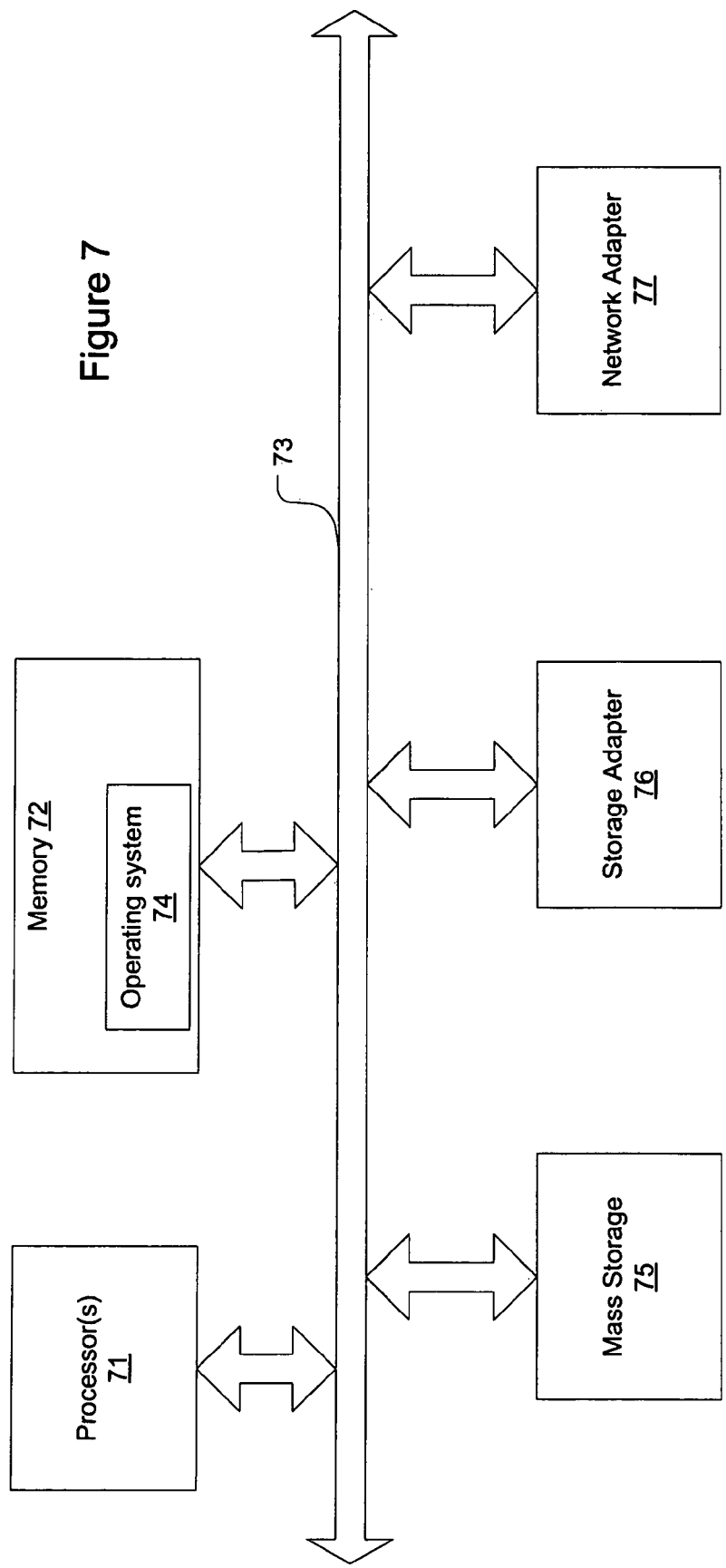

METHOD AND SYSTEM FOR ENABLING AN APPLICATION IN A VIRTUALIZED ENVIRONMENT TO COMMUNICATE WITH MULTIPLE TYPES OF VIRTUAL SERVERS

FIELD OF THE INVENTION

At least one embodiment of the present invention pertains to virtualization systems, and more particularly, to enabling an application in a virtualized environment to communicate with multiple types of virtual server.

BACKGROUND

Virtualization is an abstraction that decouples the physical hardware from the operating system in a data processing system to deliver greater resource utilization and flexibility. Virtualization allows multiple virtual machines with heterogeneous operating systems (e.g., Windows™, Linux™, UNIX™, etc.) and applications to run in isolation, side-by-side on the same physical machine. A virtual machine is the representation of a physical machine by software. A virtual machine has its own set of virtual hardware (e.g., RAM, CPU, NIC, hard disks, etc.) upon which an operating system and applications are loaded. The operating system sees a consistent, normalized set of hardware regardless of the actual physical hardware components.

FIG. 1 is a high level block diagram of a virtualized processing system (e.g., a computer). As shown, the virtualized processing system 100 includes a virtual server 101. A virtual server is virtualization software running on a physical server. The virtual server 101 abstracts physical hardware 102 (e.g., processors, memory, storage and networking resources, etc.) to be provisioned to multiple virtual machines 103.

A guest operating system 105 (e.g., Windows™, Linux™, UNIX™, etc.) is installed on each of the virtual machines 103. The virtual server 101 presents the physical hardware 102 as virtual hardware 104 to the guest operating system 105 and applications 106 running in the guest operating system 105. However, some physical hardware 102 may not be virtualized by the virtual server 101. Thus, the applications 106 will not be able to access the un-virtualized hardware for services. To solve this problem, an Application Programming Interface (API) for the virtual server 101 is provided. Through the API, the applications 106 can obtain information regarding the un-virtualized hardware from the virtual server 101. APIs for virtual servers are vendor specific. Currently, there is not a unified common interface for different types of virtual server. Thus, the source code for the applications 106 needs to be changed to be compatible with APIs of different types of virtual server. Changing the source code for applications incurs more design and implementation effort, and may introduce errors in the application software.

SUMMARY OF THE INVENTION

The present invention includes a method and system for enabling an application in a virtualized environment to communicate with multiple types of virtual servers (e.g., VMware ESX Server, Microsoft Virtual Server, Xen Virtual Server, etc.), yet without making any source code change to the application. An interface is provided so that an application (e.g., a storage management application) running in a virtual machine is able to communicate with the underlying virtual server to receive information regarding some physical hardware that are not virtualized by the virtual server. For example, such physical hardware may be an iSCSI Host Bus Adapter (iSCSI HBA) or a Fiber Channel Protocol Host Bus Adapter (Fcp HBA). After receiving such information, the application can access the physical hardware to provide services to other applications, such as storage management services.

In one embodiment, the method includes executing an application in a virtual machine installed on a virtual server. The method further includes enabling communication between the application and the virtual server through a software module, the software module being configured to allow the application to communicate with a plurality of types of virtual servers.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 7 is high level block diagram of a processing system.

DETAILED DESCRIPTION

A method and system for enabling an application in a virtualized environment to communicate with multiple types of virtual server are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 1:
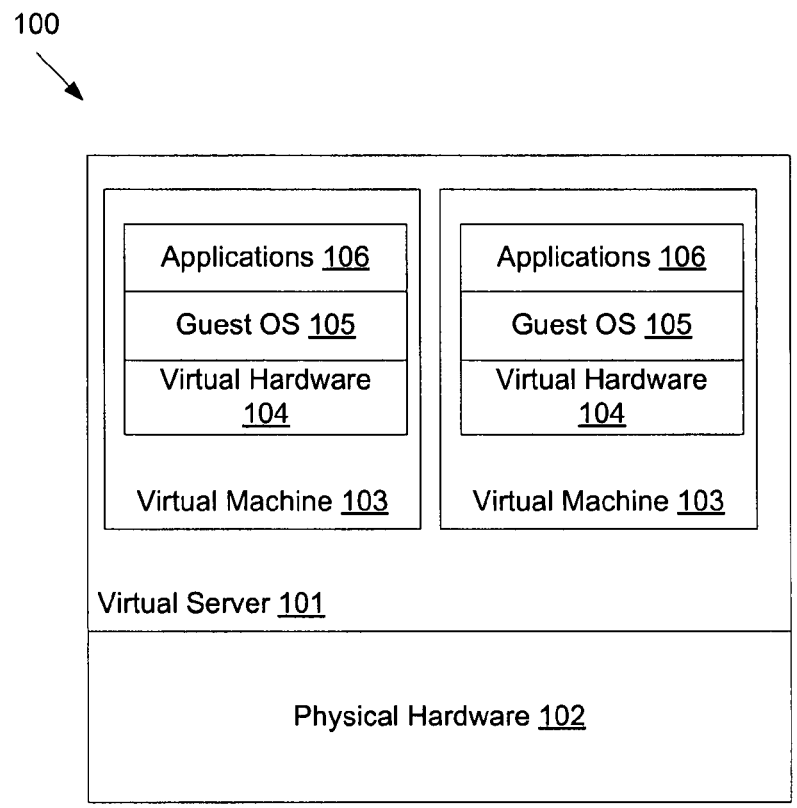
FIG. 1 is a prior art high level block diagram of a virtualized processing system.

The present invention includes a technique to enable an application in a virtualized environment to communicate with multiple types of virtual server (e.g., VMware ESX server, Microsoft Virtual Server, etc.), yet without making any source code change to the application. According to the technique that will be introduced in detail below, an interface is provided so that an application (e.g., a storage management application) running in a virtual machine such as shown in FIG. 1 is able to communicate with the underlying virtual server to receive information regarding some physical hardware that is not virtualized by the virtual server. In one embodiment, such physical hardware is an Internet Simple Computer Storage Interface (iSCSI) Host Bus Adapter (HBA) or a Fiber Channel Protocol (FCP) HBA. After receiving such information, the application can access the physical hardware to provide services to other applications, such as storage management services.

Figure 2:
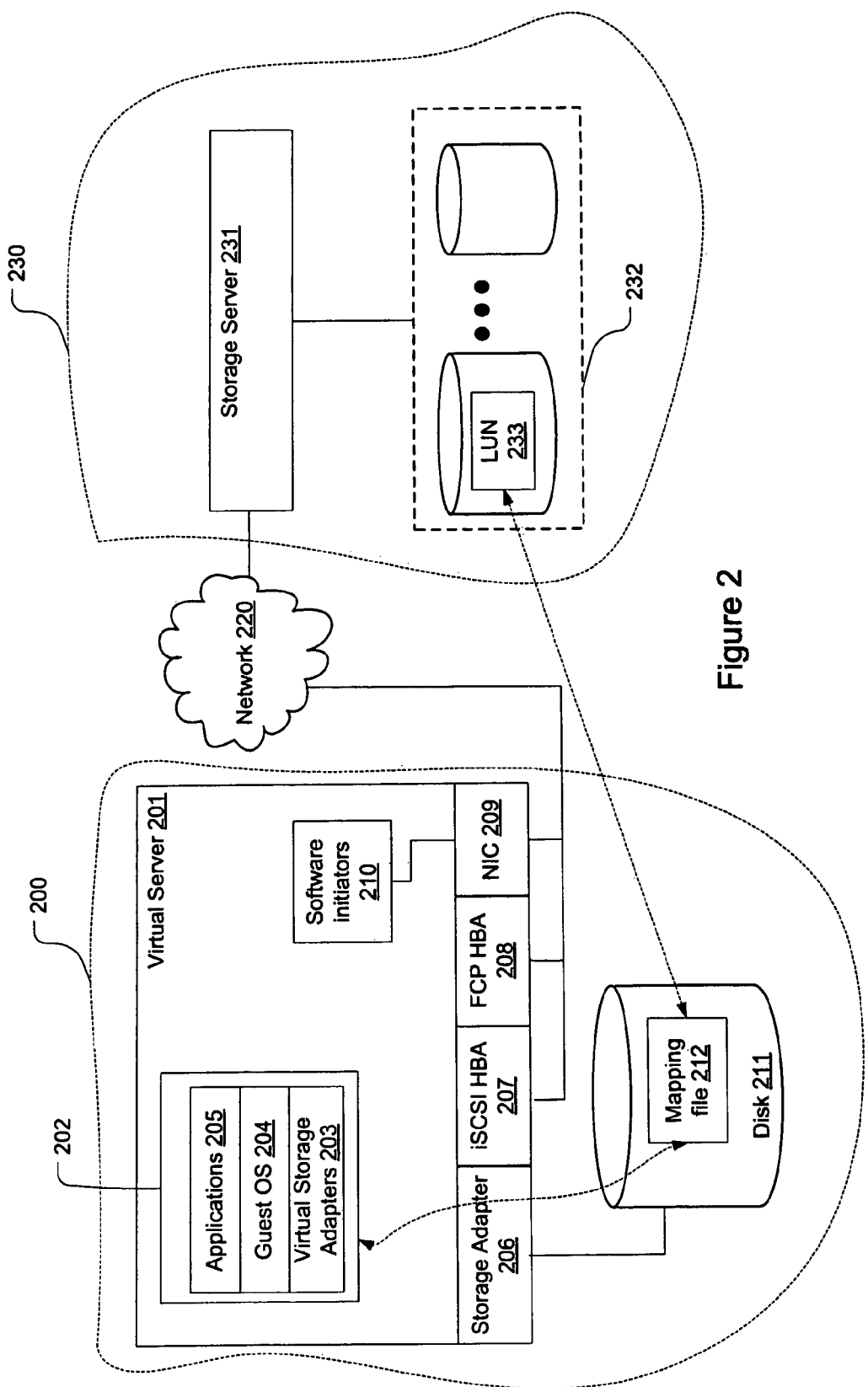
FIG. 2 illustrates a network environment in which the present invention may be implemented.

FIG. 2 illustrates network environment in which the present invention may be implemented. As shown in FIG. 2, a virtualized processing system 200 such as shown in FIG. 1 is connected with a storage area network (SAN) 230 via a network 220.

As shown in FIG. 2, the SAN 230, or sometimes referred to as NAS, includes a storage server 231 and a storage subsystem 232. The storage server 231 is a processing system configured to provide clients (e.g., the virtualized processing system 200) with block-level and/or file level access to stored data, e.g., a Logical Unit Number (LUN) 233. The storage server 231 can be a computing device configured to provide storage services, e.g., a network routing device, a personal computer, etc.

The virtualized processing system 200 includes a virtual server 201. An example of such a virtual server is VMware ESX server. The virtual server 201 provides a virtual machine 202, on which a guest operating system 204 is installed. The virtualized processing system 200 also includes a number of physical hardware devices, such as a storage adapter 206, an iSCSI HBA 207, an FCP HBA 208, a Network Interface Controller (NIC) 209, and a disk 211. The virtualized processing system 200 can access storage via such physical hardware. For example, the virtualized processing system 200 can access a local disk 211 via the storage adapter 206. The virtualized processing system 200 can also access the LUN 233 via the iSCSI HBA 207, the FCP HBA 208, or the combination of a software initiator 210 with the NIC 209 through the network 220. The virtual server 201 presents these storage adapters [how] and HBAs as virtual storage adapters 203 to the virtual machine 202. The guest operating system 204 and its applications 205 perform read/write operations via these virtual storage adapters 203.

Raw Device Mapping (RDM) is a well known technique that provides a mechanism for a virtual machine to have direct access to a LUN on a physical storage subsystem. For example, a mapping file 212 can be created for the virtual machine 202. The mapping file 212 contains information that can be used to locate the LUN 233. Such information can be the identifier of the LUN 233. When the LUN 233 is opened for access, a virtual machine file system (not shown in figure) of the virtual server 201 resolves the mapping file 212 to the correct physical device and performs appropriate access checks and locking. Thereafter, reads and writes go directly to the LUN 233 rather than going through the mapping file 212. RDM is useful for supporting LUN provisioning and Persistent Point-in-time Image (PPI) management applications. An example of such an application is NetApp® SnapDrive™, developed by Network Appliance, Inc. of Sunnyvale, Calif.

In the virtual machine 202, applications 205, such as LUN provisioning and PPI management applications, access the LUN 233 through virtual storage adapters 203 that are virtualized from the underlying iSCSI and FCP HBAs. Examples of LUN provisioning and PPI management applications include NetApp SnapManager™ and NetApp SnapDrive™, both developed by Network Appliance, Inc. of Sunnyvale, Calif. However, as discussed in the "Background" section of the present application, it is possible that the virtual server 201 does not virtualize the iSCSI HBA 207 and the FCP HBA 208. As a result, the applications 205 do not see these hardware initiators and, therefore, cannot access the LUN 233.

One way to solve the problem is to permit the applications 205 to call an API provided for the virtual server 201 to get the iSCSI/FCP HBA information. Such information includes the HBA's name, speed, status, etc. However, because different virtualization software vendors have different APIs for virtual servers, the source code for the applications 205 need to be changed to be compatible with different types of virtual server. For example, if a SnapDrive application is designed and developed to make VMware ESX server specific API calls, the SnapDrive application would not be able to make Microsoft Virtual server specific API calls, because Microsoft Virtual server's API is different from VMware ESX server's API. Therefore, a different version of SnapDrive application needs to be designed and developed for Microsoft Virtual server.

The present invention provides an interface, through which the applications 205, without any source code change, can communicate with various types of virtual servers. In one embodiment, such an interface is packaged as a software module installed on the virtual machine 202. When the software module is installed and initialized on the virtual machine 202, the software module detects the type of the underlying virtual server and loads a corresponding sub-module (e.g., a set of classes) that is implemented particularly for the virtual server. Therefore, applications 205 would be able to communicate with the underlying virtual server via the corresponding sub-module. Here, load a software module or sub-module means creating an instance of the software module or sub-module in the main memory of a processing system.

Figure 3:
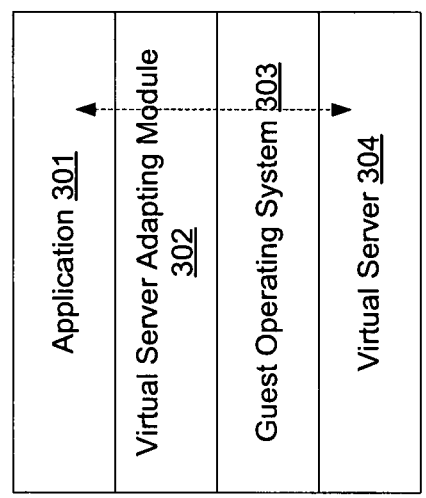
FIG. 3 illustrates the different layers of software modules in a virtualized processing system such as shown in FIG. 1.

FIG. 3 illustrates the different layers of software modules in the virtualized processing system such as shown in FIG. 1, according to an embodiment of the present invention. As shown, the bottom layer software module is the virtual server 304, which provides a virtual environment in which the guest operating system 303 can be installed. The virtual server adapting module 302 runs as an application on top of the guest operating system 303. In one embodiment, the present invention is implemented in the virtual server adapting module 302. The virtual server adapting module 302 provides an interface for the application 301, through which the application 301 can communicate with any type of virtual server.

Figure 4:
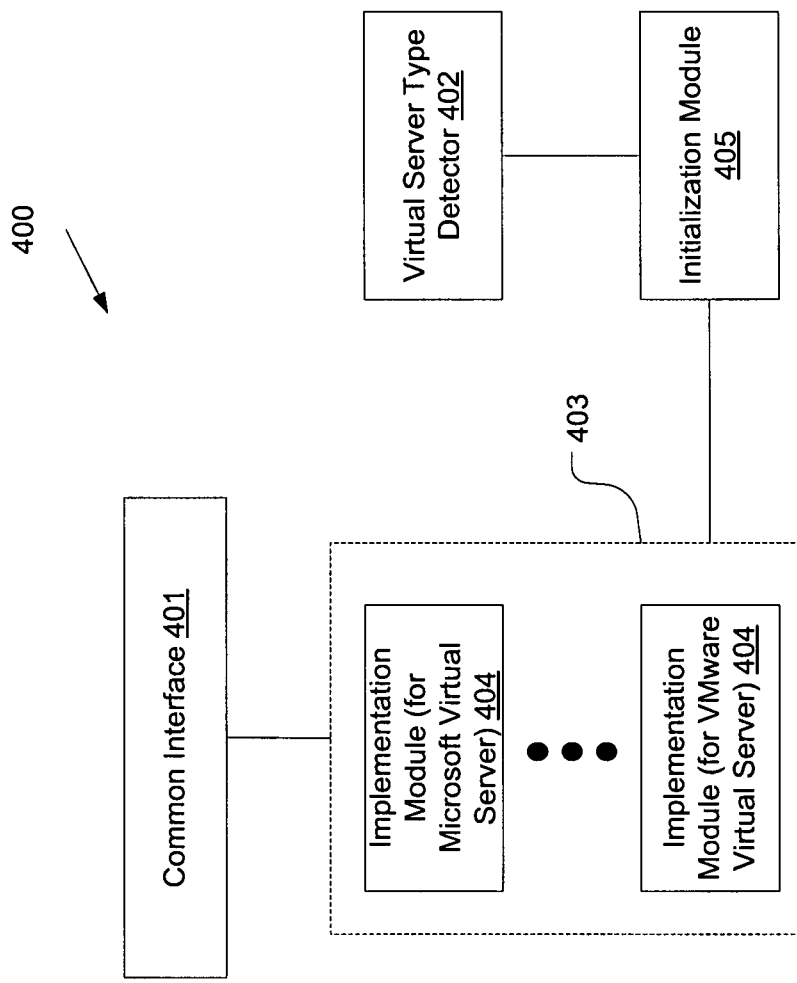
FIG. 4 illustrates a virtual server adapting module such as shown in FIG. 3, according to an embodiment of the present invention.

FIG. 4 illustrates a virtual server adapting module such as shown in FIG. 3, according to an embodiment of the present invention. As shown, the virtual server adapting module 400 includes an interface 401, an implementation pool 403, a virtual server type detector 402, and an initialization module 405. The implementation pool 403 includes a number of implementation modules 404, each for a particular type of virtual server. For example, one of the implementation modules 404 may be for Microsoft Virtual Server and one of the implementation modules 404 may be for VMware ESX Server. However, any suitable virtual server is possible, as long as the virtual server permits the virtualization of the underlying physical hardware. In one embodiment, an application makes an API call via the interface 401. Upon receiving the API call, a function or procedure of the implementation module 404 is invoked to process the API call. The function or procedure of the implementation module 404 retrieves the parameters from the API call and uses the parameters to compose a different API call that is specific to the underlying virtual server. The function or procedure of the implementation module 404 then waits for a result to be returned from the virtual server. After receiving the returned result, the function or procedure of the implementation module 404 returns the received result to the calling application.

In one embodiment, when the virtual server adapting module is being installed and initialized, by the initialization module 405, on a virtual machine, the virtual server type detector 402 determines the type of the underlying virtual server. One way to detect the type of the virtual server is to locate a Dynamic Link Library (DLL) that is particular to a type of virtual server. For example, if the guest operating system is Windows™, the virtual server type detector 402 searches the "System32" directory to find the DLL. In one embodiment, "vmGuestlib.dll" exists under "System32" directory if the virtual server is VMWare virtual server. In another embodiment of the present invention, if the guest operating system is Windows™, the virtual server type detector 402 can retrieve Windows Registry to find out the type of the underlying virtual server. Windows registry is a database which stores settings and options for the operating system. It contains information and settings for all the hardware, operating system software, etc. For example, if the underlying virtual server is VMWare virtual server, the Windows Registry will contain a key: "HKLM\SYSTEM\CurrentControlSet\Services\VMMEMCTL"

Depending on the type of the virtual server determined by the virtual server type detector 402, the initialization module 405 selects an implementation module 404 developed for the particular type of virtual server from the pool 403. In one embodiment, the pool 403 maintains a list (not shown in FIG. 4) of a number of implementation modules 404. Each entry of the list contains a pointer pointing to a corresponding implementation module 404 and a descriptor of the implementation module 404. The descriptor may contain the name of the virtual server to which the corresponding implementation module 404 corresponds. Any API call or request received from any application by the interface 401 will be forwarded to the loaded implementation module 404 and the implementation module 404 will forward the call or request to the underlying virtual server.

Figure 5:
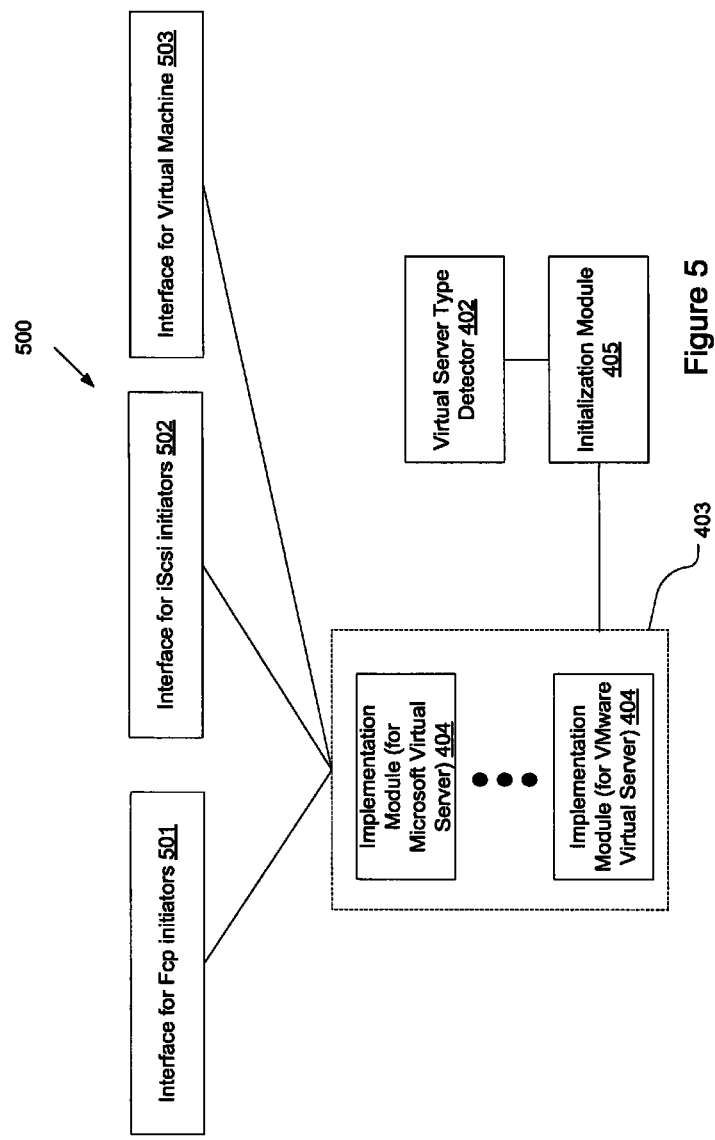
FIG. 5 illustrates a virtual server adapting module such as shown in FIG. 3, according to another embodiment of the present invention.

FIG. 5 illustrates a virtual server adapting module such as shown in FIG. 3, according to another embodiment of the present invention. As shown, the virtual server adapting module 500 is similar to the virtual server adapting module 400 shown in FIG. 4, except that the virtual server adapting module 500 divides the interface into three interfaces: the interface 501 for FCP initiators, the interface 502 for iSCSI initiators, and interface 503 for virtual machine. The interface 501 for FCP Initiators is provided for all operations regarding FCP initiators. The interface 502 for iSCSI initiators is provided for all operations regarding iSCSI initiators. The interface 503 for virtual machine is provided for all general operations regarding the virtual machine. Accordingly, each of the implementation modules 404 needs to implement all three interfaces 501-503.

Note that virtual server adapting modules 400 and 500 may be implemented by any programming language, such as Java, C++, etc. Each of the implementation modules 404 further, illustratively, may be a set of classes in an Object Oriented Programming Language (e.g., Java classes, C++ classes, etc.)

Figure 6:
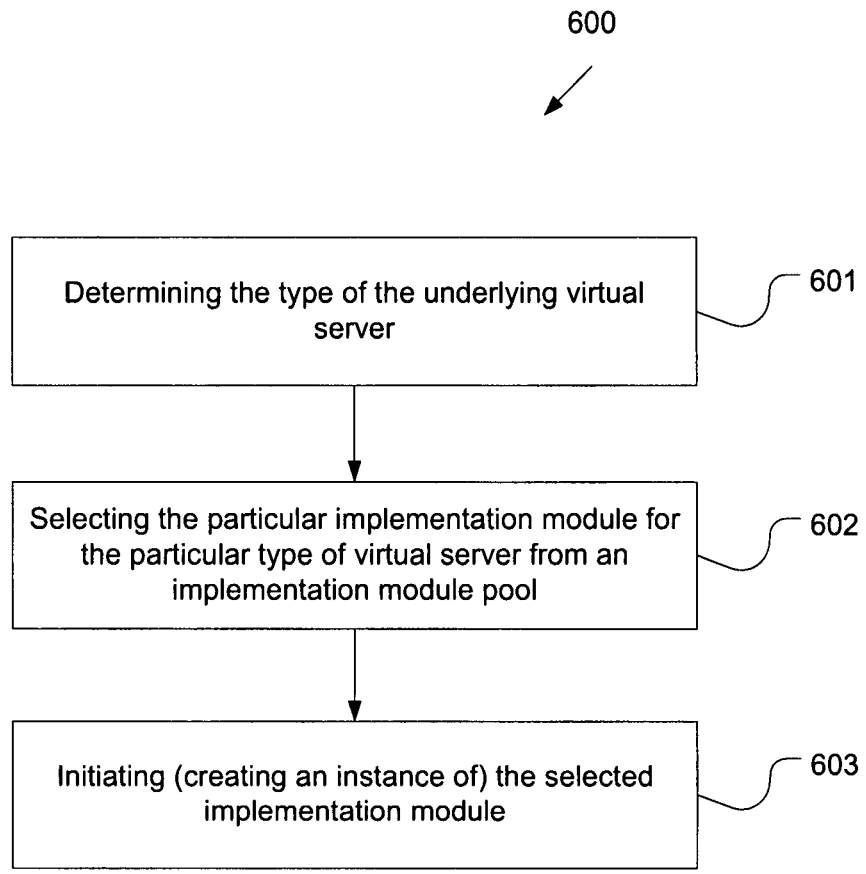
FIG. 6 is a flow diagram illustrating a procedure of installing and initializing the virtual server adapting module, according to an embodiment of the present invention.

FIG. 6 is a flow diagram illustrating a procedure of initializing the virtual server adapting module, according to an embodiment of the present invention. In one embodiment, the procedure 600 is implemented in the initialization module 405. At block 601, the initialization module 405 requests the virtual server type detector 402 to determine the type of the underlying virtual server. As discussed above, the determination may be achieved by checking the existence of particular DLLs or windows registries.

At block 602, the initialization module 405 selects the particular implementation module 403 for the particular type of virtual server determined at block 601 from the implementation pool 402.

At block 603, the initialization module 405 initiates the selected implementation module. Here, the term "initiate" means creating an instance of the selected implementation module. The initiated implementation module will be used for handling API calls or requests received by the interface which is implemented by the initiated implementation module.

FIG. 7 is high level block diagram of a processing system, which can be virtualized as the virtualized processing system 100 shown in FIG. 1. Certain standard and well-known components which are not germane to the present invention are not shown. The processing system includes one or more processors 71 coupled to a bus system 73.

The bus system 73 in FIG. 7 is an abstraction that represents any one or more separate physical buses and/or point-to-point connections, connected by appropriate bridges, adapters and/or controllers. The bus system 73, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 71 are the central processing units (CPUs) of the processing system and, thus, control the overall operation of processing system. In certain embodiments, the processors 71 accomplish this by executing software stored in memory 72. A processor 71 may be, or may include, one or more programmable general-purpose or special-purpose microprocessors, digital signal processors (DSPs), programmable controllers, application specific integrated circuits (ASICs), field-programmable gate arrays (FPGAs), programmable logic devices (PLDs), or the like, or a combination of such devices.

The processing system also includes memory 72 coupled to the bus system 73. The memory 72 represents any form of random access memory (RAM), read-only memory (ROM), flash memory, or a combination thereof. Memory 72 stores, among other things, the operating system 74 of the processing system.

Also connected to the processors 71 through the bus system 73 are a mass storage device 75, a storage adapter 76, and a network adapter 77. Mass storage device 75 may be or include any conventional medium for storing large quantities of data in a non-volatile manner, such as one or more disks. The storage adapter 76 allows the processing system to access external storage systems. The network adapter 77 provides the processing system with the ability to communicate with remote devices and may be, for example, an Ethernet adapter or a Fibre Channel adapter.

Memory 72 and mass storage device 75 store software instructions and/or data, which may include instructions and/or data used to implement the techniques introduced here.

Thus, a method and system for enabling an application in a virtualized environment to communicate with multiple types of virtual servers have been described.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

"Logic", as is used herein, may include, for example, software, hardware and/or combinations of hardware and software.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
executing an application on a guest operating system, wherein the guest operating system controls a virtual machine installed on a virtual server, and wherein the virtual server is installed on a virtualized processing system; and
enabling communication between the application and the virtual server through a virtual server adapting module in the guest operating system, wherein the virtual server adapting module is configured for:
receiving a request, by an interface, from the application on the guest operating system to get information regarding a physical hardware device on the virtualized processing system associated with the guest operating system,
automatically determining, by a virtual server type detector, a type of virtual server from a plurality of virtual servers,
selecting and instantiating, by an initialization module, an implementation module from a plurality of implementation modules according to the determined type of the virtual server, wherein each implementation module implements the interface to receive the request from the application on the guest operating system and communicates with a different type of virtual server on the virtualized processing system.

2. The method of claim 1, wherein the plurality of types of virtual servers comprises a VMware ESX virtual server, a Microsoft Virtual server, a XEN Virtual server.

3. The method of claim 1, wherein the automatically determining, by a virtual server type detector, a type of virtual server from a plurality of virtual servers, comprises locating a Dynamic Link Library (DLL) and determining the type of the virtual server based on a name of the DLL.

4. The method of claim 1, wherein the automatically determining, by a virtual server type detector, a type of virtual server from a plurality of virtual servers, comprises searching for a registration key in a registry database of a guest operating system of the virtual machine and determining the type of the virtual server based on the registration key.

5. The method of claim 1, wherein the application communicates with a virtual server to obtain information regarding a Host Bus Adapter (HBA).

6. The method of claim 5 wherein the application can directly access a Logical Unit Number (LUN) via the HBA, the LUN being maintained by a storage server.

7. A processing system comprising:
a processor;
a memory coupled to the processor, the memory storing instructions which, when executed by the processor, cause the processing system to perform a process comprising:
executing an application on a guest operating system, wherein the guest operating system controls a virtual machine installed on a virtual server, and wherein the virtual server is installed on a virtualized processing system;
executing a virtual server adapting module in the guest operating system, wherein the virtual server adapting module is configured for:
receiving a request, by an interface, from the application on the guest operating system to get information regarding a physical hardware device on the virtualized processing system associated with the guest operating system,
automatically determining, by a virtual server type detector, a type of virtual server from a plurality of virtual servers,
selecting and instantiating, by an initialization module, an implementation module from a plurality of implementation modules according to the determined type of the virtual server, wherein each implementation module implements the interface to receive the request from the application on the guest operating system and communicates with a different type of virtual server on the virtualized processing system.

8. The processing system of claim 7, wherein said automatically determining a type of a virtual server running on the processing system comprises searching a Dynamic Link Library (DLL) and determining the type of the virtual server based on a name of the DLL, or searching a registration key and determining the type of the virtual server based on the registration key.

9. The processing system of claim 7, wherein the hardware is an Internet Simple Computer Storage Interface (iSCSI) Host Bus Adapter (HBA) or a Fiber Channel Protocol (FCP) HBA, through which an application running in the processing system can directly access a Logical Unit Number (LUN) stored in a Storage Area Network (SAN).

10. An apparatus comprising:
a first physical hardware device and a second physical hardware device, wherein the first and second physical hardware devices are installed in a virtualized processing system;
a virtual server to present the first physical hardware device as a virtual hardware device to a virtual machine, wherein the virtual server does not present the second physical hardware device as a virtual hardware device;
a guest operating system installed on the virtual machine;
a virtual server adapting module running in the guest operating system, the virtual server adapting module including:
an interface to receive a request from an application on the guest operating system to get information regarding the second physical hardware device installed in the virtualized processing system;
a virtual server type detector to determine a type of the virtual server,
a plurality of implementation modules, each implementation module implementing the interface to receive the request from the application on the guest operating system and communicating with a different type of virtual server on the virtualized processing system, and
an initialization module to select and instantiate an implementation module from the plurality of implementation modules according to the determined type of the virtual server on the virtualized processing system.

11. The apparatus of claim 10, wherein the interface comprises a first interface for operations regarding an Internet Simple Computer Storage Interface (iSCSI) Host Bus Adapter (HBA), a second interface for operations regarding a Fiber Channel Protocol (Fcp) HBA, and a third interface for operations regarding the virtual machine.

12. A non-transitory machine-readable medium having sequences of instructions stored therein which, when executed by a processor of a processing system, cause the processor to perform a process comprising:

executing an application on a guest operating system, wherein the guest operating system controls a virtual machine installed on a virtual server running on the processing system, and wherein the virtual server is installed on a virtualized processing system, the virtualized processing system including a plurality of physical hardware devices; and enabling communication between the application and the virtual server through a virtual server adapting module in the guest operating system, wherein the virtual server adapting module is configured for:

receiving a request, by an interface, from the application on the guest operating system to get information regarding a physical hardware device on the virtualized processing system associated with the guest operating system, automatically determining, by a virtual server type detector, a type of virtual server from a plurality of virtual servers, selecting and instantiating, by an initialization module, an implementation module from a plurality of implementation modules according to the determined type of the virtual server, wherein each implementation module implements the interface to receive the request from the application on the operating system and communicates with a different type of virtual server on the virtualized processing system.

13. The non-transitory machine-readable medium of claim 12, wherein automatically determining, in the software module, the type of the virtual server comprises locating a Dynamic Link Library (DLL) and determining the type of the virtual server based on a name of the DLL or searching a registration key in a registry database of a guest operating system of the virtual machine and determining the type of the virtual server based on the registration key.

14. The non-transitory machine-readable medium of claim 12, wherein the application communicates with a virtual server to get information regarding a Host Bus Adapter (HBA).

\* \* \* \* \*